United States Patent
Iyer

(10) Patent No.: US 8,050,275 B1
(45) Date of Patent: Nov. 1, 2011

(54) SYSTEM AND METHOD FOR OFFERING QUALITY OF SERVICE IN A NETWORK ENVIRONMENT

(75) Inventor: Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1066 days.

(21) Appl. No.: 10/715,815

(22) Filed: Nov. 18, 2003

(51) Int. Cl.
*H04L 12/56* (2006.01)
(52) U.S. Cl. ............... 370/395.21; 370/395.43; 370/428
(58) Field of Classification Search .................. 370/338, 370/395.21, 392, 401, 402, 395.43, 428
See application file for complete search history.

(56) References Cited

U.S. PATENT DOCUMENTS

| | | | |
|---|---|---|---|
| 5,774,660 A | 6/1998 | Brendel et al. ............ | 395/200.31 |
| 5,951,694 A | 9/1999 | Choquier et al. ............... | 714/15 |
| 6,006,264 A | 12/1999 | Colby et al. ................... | 709/226 |
| 6,016,305 A | 1/2000 | Borst et al. .................... | 370/234 |
| 6,128,642 A | 10/2000 | Doraswamy et al. ......... | 709/201 |
| 6,128,657 A | 10/2000 | Okanoya et al. .............. | 709/224 |
| 6,137,777 A | 10/2000 | Vaid et al. ..................... | 370/230 |
| 6,185,619 B1 | 2/2001 | Joffe et al. ..................... | 709/229 |
| 6,201,962 B1 | 3/2001 | Sturniolo et al. ............. | 455/432 |
| 6,249,801 B1 | 6/2001 | Zisapel et al. ................ | 709/105 |
| 6,263,368 B1 | 7/2001 | Martin .......................... | 709/224 |
| 6,298,383 B1 | 10/2001 | Gutman et al. ............... | 709/229 |
| 6,327,622 B1 | 12/2001 | Jindal et al. ................... | 709/228 |
| 6,330,602 B1 | 12/2001 | Law et al. ..................... | 709/224 |
| 6,377,571 B1 | 4/2002 | Tai ................................ | 370/355 |
| 6,377,982 B1 | 4/2002 | Rai et al. ....................... | 709/217 |
| 6,393,458 B1 | 5/2002 | Gigliotti et al. ............... | 709/203 |
| 6,393,482 B1 | 5/2002 | Rai et al. ....................... | 709/225 |
| 6,400,722 B1 | 6/2002 | Chuah et al. .................. | 370/401 |
| 6,414,950 B1 | 7/2002 | Rai et al. ....................... | 370/338 |
| 6,421,714 B1 | 7/2002 | Rai et al. ....................... | 709/217 |
| 6,434,618 B1 | 8/2002 | Cohen et al. .................. | 709/228 |
| 6,442,165 B1 | 8/2002 | Sitaraman et al. ......... | 370/395.4 |
| 6,466,571 B1 | 10/2002 | Dynarski et al. .............. | 370/352 |
| 6,473,802 B2 | 10/2002 | Masters ......................... | 709/229 |
| 6,484,143 B1 | 11/2002 | Swildens et al. .................. | 705/1 |
| 6,512,754 B2 | 1/2003 | Feder et al. ................... | 370/338 |
| 6,529,501 B1 | 3/2003 | Zhao et al. .................... | 370/353 |
| 6,618,591 B1 * | 9/2003 | Kalliokulju et al. ........ | 455/452.2 |
| 6,636,491 B1 * | 10/2003 | Kari et al. ..................... | 370/328 |
| 6,654,610 B1 * | 11/2003 | Chen et al. .................... | 455/450 |
| 6,711,147 B1 | 3/2004 | Barnes et al. | |

(Continued)

FOREIGN PATENT DOCUMENTS

FR 2 852 178 A1 9/2004

(Continued)

OTHER PUBLICATIONS

Supporting packet-data QoS in next generation cellular networks; R Koodli—Communications Magazine, IEEE, 2001.*

(Continued)

*Primary Examiner* — Salman Ahmed
(74) *Attorney, Agent, or Firm* — Baker Botts L.L.P.

(57) ABSTRACT

A method for providing a quality of service in a network environment is provided that includes receiving communication session information associated with a packet data protocol (PDP) link for an end user. The communication session information may be mapped to the end user in order to generate a quality of service attribute to be communicated to a next destination.

15 Claims, 2 Drawing Sheets

U.S. PATENT DOCUMENTS

| | | | |
|---|---|---|---|
| 6,847,610 B1* | 1/2005 | Suumaki et al. | 370/230.1 |
| 7,170,869 B2* | 1/2007 | Yang et al. | 370/328 |
| 7,512,104 B2* | 3/2009 | Bjelland et al. | 370/338 |
| 7,536,187 B2* | 5/2009 | Oswal et al. | 455/452.1 |
| 7,599,323 B2 | 10/2009 | Chandranmenon et al. | |
| 7,634,274 B2* | 12/2009 | Hurtta | 455/450 |
| 7,643,411 B2* | 1/2010 | Andreasen et al. | 370/229 |
| 7,756,040 B1* | 7/2010 | Andriantsiferana et al. | 370/236 |
| 2001/0048683 A1* | 12/2001 | Allan et al. | 370/395.21 |
| 2002/0032800 A1 | 3/2002 | Puuskari et al. | |
| 2003/0060210 A1 | 3/2003 | Ravishankar et al. | |
| 2003/0108015 A1* | 6/2003 | Li | 370/338 |
| 2003/0112782 A1* | 6/2003 | Mizell et al. | 370/338 |
| 2003/0118038 A1* | 6/2003 | Jalava et al. | 370/401 |
| 2003/0126435 A1* | 7/2003 | Mizell et al. | 713/168 |
| 2003/0142643 A1* | 7/2003 | Yang et al. | 370/328 |
| 2003/0235174 A1* | 12/2003 | Pichna et al. | 370/338 |
| 2004/0037269 A1 | 2/2004 | Lundin | |
| 2004/0038700 A1* | 2/2004 | Gibbs | 455/522 |
| 2004/0105393 A1* | 6/2004 | Ronneke et al. | 370/252 |
| 2004/0109455 A1 | 6/2004 | Jouppi et al. | |
| 2004/0162105 A1* | 8/2004 | Reddy et al. | 455/551 |
| 2004/0221051 A1* | 11/2004 | Liong et al. | 709/230 |
| 2004/0248583 A1* | 12/2004 | Satt et al. | 455/452.2 |
| 2004/0266394 A1* | 12/2004 | Mizell et al. | 455/408 |
| 2005/0025164 A1* | 2/2005 | Kavanagh et al. | 370/401 |
| 2005/0030920 A1* | 2/2005 | Garcia Cadarso et al. | 370/328 |
| 2005/0041584 A1* | 2/2005 | Lau et al. | 370/235 |
| 2005/0044138 A1* | 2/2005 | Albert et al. | 709/203 |
| 2005/0058068 A1 | 3/2005 | Ben Ali et al. | |
| 2005/0120350 A1* | 6/2005 | Ni et al. | 718/105 |
| 2005/0185583 A1 | 8/2005 | Hosein | |
| 2005/0210141 A1 | 9/2005 | Oyama et al. | |
| 2006/0020938 A1 | 1/2006 | Elcock et al. | |
| 2006/0050667 A1* | 3/2006 | Verma et al. | 370/338 |
| 2006/0072595 A1* | 4/2006 | Broberg et al. | 370/410 |
| 2006/0140149 A1* | 6/2006 | Kim et al. | 370/331 |
| 2006/0173968 A1* | 8/2006 | Vaarala et al. | 709/214 |
| 2007/0058561 A1 | 3/2007 | Virgile | |
| 2007/0124490 A1* | 5/2007 | Kalavade et al. | 709/230 |
| 2007/0213058 A1* | 9/2007 | Shaheen | 455/436 |
| 2008/0068995 A1 | 3/2008 | Skog | |
| 2008/0259865 A1* | 10/2008 | Hurtta et al. | 370/329 |
| 2008/0267154 A1* | 10/2008 | Johansson et al. | 370/338 |
| 2010/0182910 A1* | 7/2010 | Norefors et al. | 370/241 |
| 2011/0116499 A1* | 5/2011 | Lim et al. | 370/355 |

FOREIGN PATENT DOCUMENTS

| | | |
|---|---|---|
| WO | WO 2004/082224 A2 | 9/2004 |
| WO | WO 2006/004471 A1 | 1/2006 |

OTHER PUBLICATIONS

Resource management and quality of service in third generation wireless networks; S Dixit, Y Guo—Communications Magazine, IEEE, 2001.* nter-Operator IP QoS Framework—ToIP and UMTS Case Studies; P. Belloni, T Eskedal, M Ficaccio, C Hatch— 2002.*

Information Sciences Institute, "Internet Protocol, DARPA Internet Program Protocol Specification," Univ. of Southern Califorinia, 49 pgs., Sep. 1981.

S. Deering, "Host Extensions for IP Multicasting," Stanford University, 17 pgs., Aug. 1989.

*"A ubiquitous network resource control plane for end-to-end QoS"*, Technical White Paper, Copyright 2005 Operax AB, 7 pages, Feb. 2005.

Hui-Lan Lu, Ph.D., *"Quality of Service Standardization for Next Generation Networks"*, International Telecommunication Union, ITU-T NGN Technical Workshop, Jeju Island, Korea, 16 pages, Mar. 14-15, 2005.

*"Architectural Enhancements for End-to-End Quality of Service"*, www.tkn.tu-berlin.de/curricula, 10 pages, Printed May 2005.

Pending U.S. Appl. No. 11/190,704 entitled, *"Dynamically Providing A Quality of Service for A Mobile Node"*, 33 pages specification, claims and abstract, 2 pages of drawings, inventor Laurent H. Andriantsiferana et al., filed Jul. 26, 2005.

PCT Notification of Transmittal of the International Search Report and the Written Opinion of the International Searching Authority, or the Declaration with attached PCT International Search Report and Written Opinion of the International Searching Authority in International Application No. PCT/US2006/027951, dated Nov. 21, 2006, 13 pages.

USPTO, Office Action dated Jun. 10, 2008 for U.S. Appl. No. 11/190,704, filed Jul. 26, 2005 in the name of Laurent H. Andriantsiferana, 17 pages.

European Patent Office, Communication Pursuant to Article 94(3) EPC, Application No. 06 787 793.6-2412, 4 pages, dated Jul. 11, 2008.

USPTO, Office Action dated Dec. 22, 2008 for U.S. Appl. No. 11/190,704, filed Jul. 26, 2005 in the name of Laurent H. Andriantsiferana, 31 pages.

USPTO, Interview Summary dated Mar. 25, 2009 for U.S. Appl. No. 11/190,704, filed Jul. 26, 2005 in the name of Laurent H. Andriantsiferana, 2 pages.

USPTO, Final Office Action dated Jul. 10, 2009 for U.S. Appl. No. 11/190,704, filed Jul. 26, 2005 in the name of Laurent H. Andriantsiferana, 29 pages.

USPTO, Office Action dated Oct. 16, 2009 for U.S. Appl. No. 11/190,704, filed Jul. 26, 2005 in the name of Laurent H. Andriantsiferana, 37 pages.

USPTO, Final Office Action dated Mar. 29, 2010 for U.S. Appl. No. 11/190,704, filed Jul. 26, 2005 in the name of Laurent H. Andriantsiferana, 40 pages.

USPTO, Office Action dated Jul. 22, 2010 for U.S. Appl. No. 11/190,704, filed Jul. 26, 2005 in the name of Laurent H. Andriantsiferana, 36 pages.

USPTO, Office Action dated Jan. 6, 2011 for U.S. Appl. No. 11/190,704, filed Jul. 26, 2005 in the name of Laurent H. Andriantsiferana, 42 pages.

State Intellectual Property Office of the People's Republic of China, The First Office Action and Text of the First Office Action, Application No. 200680027500.8, Chinese Office Action and English translation transmitted to Baker Botts L.L.P. on Oct. 21, 2010, 12 pages.

* cited by examiner

| TABLE | | | | | 46 |
|---|---|---|---|---|---|
| IP ADDRESS | DATA FIELD #1 | DATA FIELD #2 | DATA FIELD #3 | MISCELLANEOUS | |
| 1.1.1.1 | POLICY NUMBER | JOHN SMITH | CURRENT SGSN | | |

SYSTEM AND METHOD FOR OFFERING QUALITY OF SERVICE IN A NETWORK ENVIRONMENT

TECHNICAL FIELD OF THE INVENTION

This invention relates in general to the field of communications and, more particularly, to a system and method for offering quality of service in a network environment.

BACKGROUND OF THE INVENTION

Networking services have become increasingly important in today's society. Certain services, functions, or capabilities may be provided to a group of end users or to clients based on a corresponding source profile or policy. Devices or components within a network must generally be able to identify such a profile or policy before offering selected enhanced services, functions, or capabilities to a targeted group of end users. Accordingly, sufficient information must be made available at various networking devices in order to allow for an accurate identification of a client or a source.

In some environments, 'compatibility' poses an issue for network operators and system designers because entities or components in the network generally understand only a specific type of signaling in the context of offering a quality of service level. A given component or entity may process such signaling information and then communicate to another component a level of quality of service that should be applied for that communication session or flow. However, certain quality of service features may be unobtainable for an end user because they fail to conform to an accepted or recognized signaling platform (e.g. session initiation protocol (SIP)). This may be true for diverse pieces of network equipment or legacy systems that are limited in the signaling that is used to accommodate their applications. Additionally, with the current SIP based Internet multimedia subsystem (IMS) architecture, it may be necessary for devices to handle the mapping between application level quality of service (QoS) and bearer level QoS. This may pose a problem for mobile operators offering services to maintain consistency across millions of handsets from different handset vendors. Accordingly, the ability to provide a mechanism that is capable of recognizing multiple types of signaling in the context of offering a selected quality of service presents a significant challenge to network administrators, component manufacturers, and system designers.

SUMMARY OF THE INVENTION

From the foregoing, it may be appreciated by those skilled in the art that a need has arisen for an improved communications approach that provides a compatibility feature to accommodate various types of signaling for network equipment. In accordance with one embodiment of the present invention, a system and a method for offering quality of service for an end user in a network environment are provided that greatly reduce disadvantages and problems associated with conventional communications techniques.

According to one embodiment of the present invention, there is provided a method for providing a quality of service in a network environment that includes receiving communication session information associated with a packet data protocol (PDP) link for an end user. The communication session information may be mapped to the end user in order to generate a quality of service attribute to be communicated to a next destination.

Certain embodiments of the present invention may provide a number of technical advantages. For example, according to one embodiment of the present invention, a communications approach is provided that allows increased compatibility in a network environment. This is a result of an ability to offer quality of service (QoS) to generic applications that are non-Internet multimedia subsystem (IMS) and non-session initiation protocol (SIP) based. This would allow other services such as video streaming, gaming, etc. to be supported as in the usual landline Internet. Moreover, such compatibility may be achieved without upgrading devices/components used by an end user. In a general sense, the network operator can manage quality of service from a network level and not on a component level.

Additionally, the present architecture may allow an operator to selectively control the quality of service offered to various applications and users based on individual capability. Thus, this gleaning function allows network equipment to offer networking features or capabilities at various quality of service levels. Hence, an increased granularity is provided by such a communications configuration, allowing for greater specificity in terms of the treatment of data flows or packets. This may in turn allow for an easier deployment of a typical tiered service platform. Such granularity and compatibility features may be achieved without inhibiting bandwidth parameters, sacrificing time, or restricting processing speeds. Moreover, the quality of service can be offered without requiring all applications on handsets/mobile stations to be modified with a mapping from application to bearer quality of service. Note that it is difficult for an operator to standardize such a mapping across different handsets/applications, even if properly supported. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figures 1, 2:
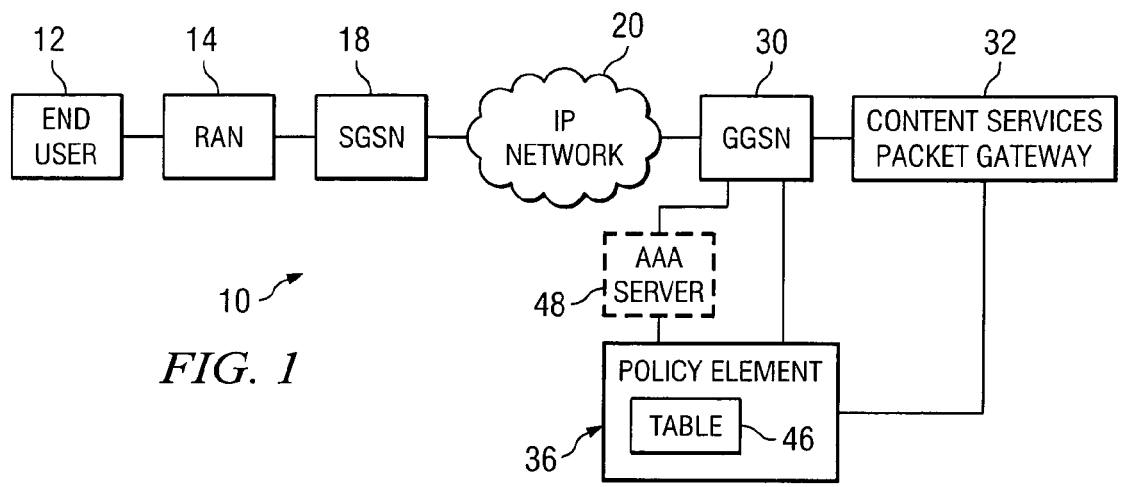
FIG. 1 is a simplified block diagram of a communications system for offering quality of service in a network environment in accordance with one embodiment of the present invention.
FIG. 2 is a simplified block diagram of a table for storing information in the communication system.

FIG. 1 is a simplified block diagram of a communication system 10 for offering quality of service (QoS) in a network environment. Communication system 10 may include an end user 12, a radio access network (RAN) 14, a serving general packet radio service (GPRS) support node (SGSN) 18, and an Internet protocol (IP) network 20. Additionally, communication system 10 may include a gateway GPRS support nodes (GGSN) 30 and a content services packet gateway (CSPG) 32. Communication system 10 may also include a policy element 36, which may include a table 46. An authentication, authorization, and accounting (AAA) server 48 may also be provided in communication system 10. AAA server 48 has been illustrated as a hatched box because communication system 10 may be readily implemented without it. As explained more fully below, communication system 10 may use various potential devices in order to glean communication session information. AAA server 48 offers just one of such potential components to cooperate with policy element 36 in delivering an appropriate quality of service to end user 12.

FIG. 1 may be generally configured or arranged to represent a 2.5G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that could benefit from a quality of service level being provided to any network element. This may be inclusive of first generation, 2G, and 3G architectures that provide features and services for any end user 12. Moreover, communication system 10 could be applied to any access network/protocol that allows end user 12 to create connections, which specify differential treatment for packets in those connections. Furthermore, the relaying of such information by any one or more CSPG devices could be implemented in any such network/access technology.

In accordance with the teachings of the present invention, communication system 10 provides an ability to offer a quality of service to end user 12 by recognizing the applications that are being initiated and, further, by allowing the network to configure the quality of the service for the application/user. This mapping can be done by the network by making use of several data segments such as capability of end user 12, the capabilities of a device/component being used by end user 12, or the subscription of end user 12. These data segments are part of the communication session information gathered by CSPG 32.

Note that certain quality of service deployments target only Internet multimedia subsystem (IMS) applications with session initiation protocol (SIP) signaling. This translates into only those devices/components capable of executing IMS signaling being able to benefit from a designated quality of service. In addition, the quality of service required needs to be signaled by the SIP servers back to the devices/components being used by end user 12. The devices/components may then perform a conversion from the SIP level quality of service to bearer level quality of service for a packet data protocol (PDP) context setup. This type of restrictive architecture prevents a mobile operator from offering a designated quality of service (e.g. offering certain user applications running over hyper-text transfer protocol (HTTP) with a selected quality of service).

Additionally, certain models may require that the devices/components initiate a request with the exact quality of service parameters being provided. This scenario poses two issues. The first is that the devices/components have to map any application layer quality of service into network layer requests. In most cases, standard applications on devices/components do not request quality of service and do not have a bearer level mapping. The second issue is that an operator is generally unable to determine that this mapping is consistent and, further, it is also a difficult task to standardize this mapping from an application layer quality of service to bearer mapping across all handset (i.e. device) implementations.

Communication system 10 resolves such issues by providing policy element 36, which is able to receive session information from CSPG 32 that is associated with end user 12 who has initiated the application that is running. That information can be used to correlate end user 12 with a policy or subscription data provided in table 46. Once the quality of service is identified, that information may be communicated to GGSN 30, which may respond by applying the identified quality of service for that communication session.

Communication system 10 addresses a compatibility issue in order to deliver a variety of services, functions, and features to users coming to GGSN 30. End user 12 could have multiple tunnels (i.e. primary and secondary PDPs) within a GTP tunnel. Each sub-tunnel could carry traffic for end user 12 of a specified application and receive a specified quality of service provided by GGSN 30. Consider an example where a mobile station is engaged in running a web browser and a voice-over IP application for telephony (simultaneously). Note that the telephony application has less tolerance for latency and delay because of the nature of such an application, and the mobile station may desire to have a second PDP having a higher quality of service for the voice traffic than for the HTTP traffic. GGSN 30 is capable of assigning or applying the correct quality of service based on information provided by policy element 36. GGSN 30 may perform this by setting a selected quality of service bit that would give a corresponding PDP a higher quality of service (e.g. giving a packet a higher priority in a corresponding queue) or any other enhancement that would achieve a higher quality of service.

A problem may exist, without the use of communication system 10, because different signaling platforms may cause compatibility issues involving existing network equipment. Due to this lack of compatibility, CSPG 32 and/or GGSN 30 would be unable to deliver an appropriate quality of service to individual PDPs. For example, a service provided may merit a higher billing rate for information propagating through a given PDP. This may be based on a quality of service requested by end user 12. Communication system 10 addresses this issue by allowing GGSN 30 to receive policy information relayed by policy element 36 at any appropriate time (e.g. when the PDP is created).

The configuration of communication system 10 may allow an operator to selectively control the quality of service offered to various applications and users based on an individual capability. The gleaning function provided by CSPG 32 allows network equipment to offer networking features or capabilities at varying quality of service levels. Hence, an increased granularity is provided by such a communications configuration, allowing for greater specificity in terms of the treatment of data flows or packets. This may in turn allow for an easier deployment of a typical tiered service platform. Such granularity and compatibility features may be achieved without inhibiting bandwidth parameters, sacrificing time, or restricting processing speeds. Moreover, the quality of service to applications can be offered without requiring all applications on handsets/mobile stations/devices to be modified or upgraded with a mapping from an application to bearer quality of service. System management may be achieved at a network level and not on a component level.

End user 12 is a client or a customer wishing to initiate a communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 offers connectivity and allows data to be exchanged between end user 12 and any number of selected elements within communication system 10. RAN 14 facilitates the delivery of a request packet generated by end user 12 and the reception of information sought by end user 12. RAN 14 may reserve resources based on a quality of service parameter identified by policy element 36. RAN 14 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 offers a communicative interface between end user 12 and GGSN 30 and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communication system 10.

SGSN 18 and GGSN 30 are network elements that cooperate in order to facilitate a communication session involving end user 12. GGSN 30 is a communication or network node that may be working in conjunction with multiple SGSNs 18 to provide a communications medium in a GPRS service network environment. GGSN 30 may be inclusive of a walled garden used to control user access to web content or services. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, frame relay, or any other suitable applications or platforms to operate over GSM connections.

In a particular embodiment of the present invention, GGSN 30 includes software that is operable to cooperate and interface with policy element 36. GGSN 30 may apply a quality of service parameter relayed by policy element 36. Alternatively, these functions may be provided by any suitable hardware, component, device, application specific integrated circuit (ASIC), processor, algorithm, element or object that is operable to perform such operations. The communication session information relayed by policy element 36 or CSPG 32 may be inclusive of policy information, profile data, profile or subscription information, component/device capabilities, application information, or other pertinent information relating to elements such as an IP destination address, an IP source address, a protocol type, a source port, a destination port, a security parameter, or any other appropriate data where appropriate and based on particular needs.

CSPG 32 is a client-aware device that may provide or offer some service or feature to end user 12. For example, such services may be based on an effective mapping between a source IP address of a given request packet and a user profile. Client-aware devices may key off the source IP address in providing services to an end user. There are a number of reasons why a device or a component would want to identify end user 12. For example, some devices may wish to identify end user 12 for authorization or quality of service purposes. In another example, a device may wish to maintain user profiles to provide for accounting records (for example per-user accounting) or to provide for content billing operations. Alternatively, a device or a component may use another form of identification to provide for any other type of suitable client-aware service, tool, or feature according to the particular needs of network components or equipment. Alternative forms of identification may include IMSI, MSISDN, a username, a domain, etc. Additional services may be related to areas such as routing, accounting, firewalling, filtering, or any other suitable parameters or policies where user-aware characteristics serve as a basis for service implementation.

CSPG 32 represents a generic piece of network equipment that may monitor operations or applications initiated by end user 12. CSPG 32 could be a wireless application protocol (WAP) gateway, a compression and/or optimization engine, a billing engine (inclusive of per-content billing), a service enforcement element, a content authorization component, a content inspection engine, a policy enforcement gateway, or any other element that is operable to inspect, view, modify, process, or transform data or information in a network environment.

In a particular embodiment of the present invention, CSPG 32 includes software that is operable to interface properly with GGSN 30 and/or policy element 36 such that an appropriate quality of service is identified. The software may also monitor the actions being performed by end user 12 such that communication session information is identified and sent to policy element 36. Alternatively, these functions may be provided by any suitable hardware, component, device, ASIC, processor, algorithm, element or object that is operable to achieve such operations. CSPG 32 may suitably process and/or maintain incoming communication session information in any appropriate manner. For example, such information may be kept in a database, a queue, or a table, which is described in greater detail below with reference to FIG. 2. Alternatively, such information may be stored in any suitable random access memory (RAM), read only memory (ROM), erasable programmable ROM (EPROM), electronically erasable ROM (EEPROM), or in any other suitable component, device, element or object where appropriate and based on particular needs.

As described above, CSPG 32 utilizes the identity of the client or the end user to provide services based on a source profile or policy. In a particular embodiment of the present invention, CSPG 32 provides client-aware services by operating at networking layers two and three. Accordingly, the information available at networking layers two and three provides a basis for the identification of an end user or a client. CSPG 32 may use an IP address or any other suitable parameter to uniquely identify a client or an end user. CSPG 32 may include any suitable hardware, software, components, or elements that identify a unique identifier in order to provide some networking feature or capability to an end user. Alternative identification of end-users may be done by using the MSISDN, IMSI, user-name, domain, APN or any suitable combination of these elements.

Policy element 36 is an element that is operable to authorize, as well as grant, a specific quality of service for a user and/or application. The granting or authorization of such privileges may be based on the user subscription, the user-device capability, and/or the specific application to network mappings. Policy element 36 may communicate information gleaned from communication flows to GGSN 30. In a particular embodiment of the present invention, policy element 36 includes software operable to match a user ID included within a communication flow that is accessed by CSPG 32. Additionally, policy element 36 may include software operable to facilitate communications involving GGSN 30 and CSPG 32. Alternatively, this function may be provided by any suitable hardware, component, device, ASIC, processor, algorithm, element or object that is operable to achieve such operability. Policy element 36 may suitably process and/or maintain incoming traffic pattern information (i.e. quality of service information) in any appropriate manner, such as within table 46.

AAA server 48 may be used to supplant CSPG 32 or AAA server 48 may cooperate with CSPG 32, as well as policy element 36, in providing a particular quality of service for end user 12. Accordingly, AAA server 48 may be inclusive of the same elements as CSPG 32, which are used to monitor traffic flows associated with end user 12. AAA server 48 is a server program that receives end user requests for access to networking resources. Networking resources refers to any device, component, or element that provides some functionality to end user 12. For a corresponding network, AAA server 48 may also provide authentication, authorization, and accounting services and management. Authorization generally refers to the process of giving an end user permission to do or to access something. In multi-user computer systems, a system administrator may define for the system which end users are allowed access to given locations in the system and, further, what privileges for an end user are provided. Once an end user has logged into a network, such as for example IP network 20, the network may wish to identify what resources the end user is given during the communication session. Thus, authorization within communication system 10 may be seen as both a preliminary setting up of permissions by a system administrator and the actual checking or verification of the permission values that have been set up when end user 12 is attempting access to a selected area. Authentication generally refers to the process of determining whether an end user is in fact who or what it is declared to be. In the case of private or public computer networks, authentication may be done through the use of unique identification elements such as a user identity or log-on passwords. Knowledge of the password offers a presumption that the end user is authentic. Accounting generally refers to financial or session information associated with each end user or each network and may additionally include trafficking information, session timing information, data transfer statistics, or information relating to other information flows within communication system 10.

AAA server 48 may receive the IP address and other parameters from any suitable source, such as via a dynamic host configuration protocol (DHCP) server or a domain name system (DNS) database element, in order to direct data to be communicated to end user 12. AAA server 48 may include any suitable hardware, software, components, or elements that operate to receive data associated with end user 12 and provide corresponding AAA-related functions to network components within communication system 10. Authorization and IP address management may be retrieved by AAA server 48 from a layer two tunneling protocol network server (LNS), which may be provided to address secure services for end user 12 where appropriate.

FIG. 2 is a simplified block diagram illustrating table 46 included within policy element 36 in an example implementation of communication system 10. Table 46 may be created and stored within or external to policy element 36. Additionally, table 46 (along with policy element 36) may be provided within CSPG 32 in alternative embodiments of the present invention. Table 46 may include any suitable software, hardware, RAM, ASIC, algorithm, ROM, EPROM, EEPROM, or in any other suitable component, device, element or object where appropriate and based on particular needs. Table 46 may be readily replaced with a database or any other suitable memory element operable to store information associated with end user 12.

Table 46 may include (and be indexed by) any suitable information pertinent to communication sessions or flows propagation in communication system 10. For example, table 46 may include communication session information such as GGSN number, number of PDPs, policy/profile/subscription information, source IP address, destination IP address, protocol, IP address of end user 12, source and destination ports, or capability characteristics of devices being employed by end user 12. These elements may be used to differentiate quality of services or to implement different policies for handling corresponding traffic. Thus, from a given end user's IP address (or its alternative identity as described above), its traffic can be mapped to a particular policy.

Entries within table 46 may be cleaned up, deleted, or updated periodically (or alternatively updated or changed based on some event or modification to system parameters) in order to accurately reflect one or more source profiles or policies associated with one or more end users. For example, entries could be entered when a PDP is created, removed when a PDP is torn down, and updated in response to any material change in the PDP. Entries could also be deleted specifically or deleted per communications flow or per PDP. In the case of RADIUS messaging, the population of the table may be controlled by RADIUS accounting messages or by any other suitable populating protocol according to particular needs.

In operation of an example embodiment used for purposes of teaching only, table 46 may operate to manage or correlate user ID information with IP address data from a given communication or data flow. A number of entries are included within this example implementation of table 46 to execute this correlation. For example, an entry in table 46 is provided as IP address '1.1.1.1' with a data field in a first segment that defines a policy number (data field #1) and a data field in a second segment that identifies a user ID for that IP address as some person or entity (data field #2). This is illustrated by the 'John Smith' entry in FIG. 2.

Table 46 may also identify or store current SGSN information (data field #3) for end user 12 in a third segment. Table 46 may receive RADIUS updates and maintain an end user's IP address and SGSN that is being used. Table 46 may be accessed in order to indicate that end user 12 has an IP address of 1.1.1.1. Such an address may correspond to 'John Smith' and an identifier of SGSN #1 (e.g. its IP address) or that 'John Smith' is now engaging SGSN #1 (reflected by its identifier, e.g. its IP address).

Table 46 may return policy/profile information to GGSN 30 for a particular session, data flow, or end user 12. If an element with an already known user ID exists in table 46 and corresponds to any requested IP address, the identification (IP address) of the policy/subscription may be forwarded from table 46 to GGSN 30. If no IP address has a corresponding element in table 46, table 46 may notify GGSN 30 or CSPG 32 that no match exists. The IP address may be dynamically assigned when an associated device is activated, e.g., a cellular telephone is turned on. The IP address may be assigned by any suitable element, such as GGSN 30 for example. Alternatively, an IP source address may be assigned or designated in any other suitable manner. Table 46 may now be implemented to retrieve the user ID name associated with the IP address correlating to end user 12. This information may be positioned in a billing record that may be used to create a bill for a given end user 12. This may also be used (for example) to track information such as how many bytes were uploaded by end user 12 (byte counts) or how many uniform resource locator (URL) addresses were accessed (or which URL addresses were accessed) by a given end user 12.

Table 46 (or policy element 36) is, thus, provided with the capability of mapping the source IP address (or any other end user 12 parameter) to a user ID. The user ID may be obtained from an external database where appropriate or any other suitable location. Alternatively, the user ID may be extracted from a RADIUS flow, a terminal access controller access control system (TACACS) communications flow, a DIAMETER communications flow, or any other suitable communications protocol flow, communication session, or data exchange. Table 46 may be populated at any suitable time and updated using any suitable mechanism, such as via sniffing of RADIUS or TACACS flows.

Figure 3:
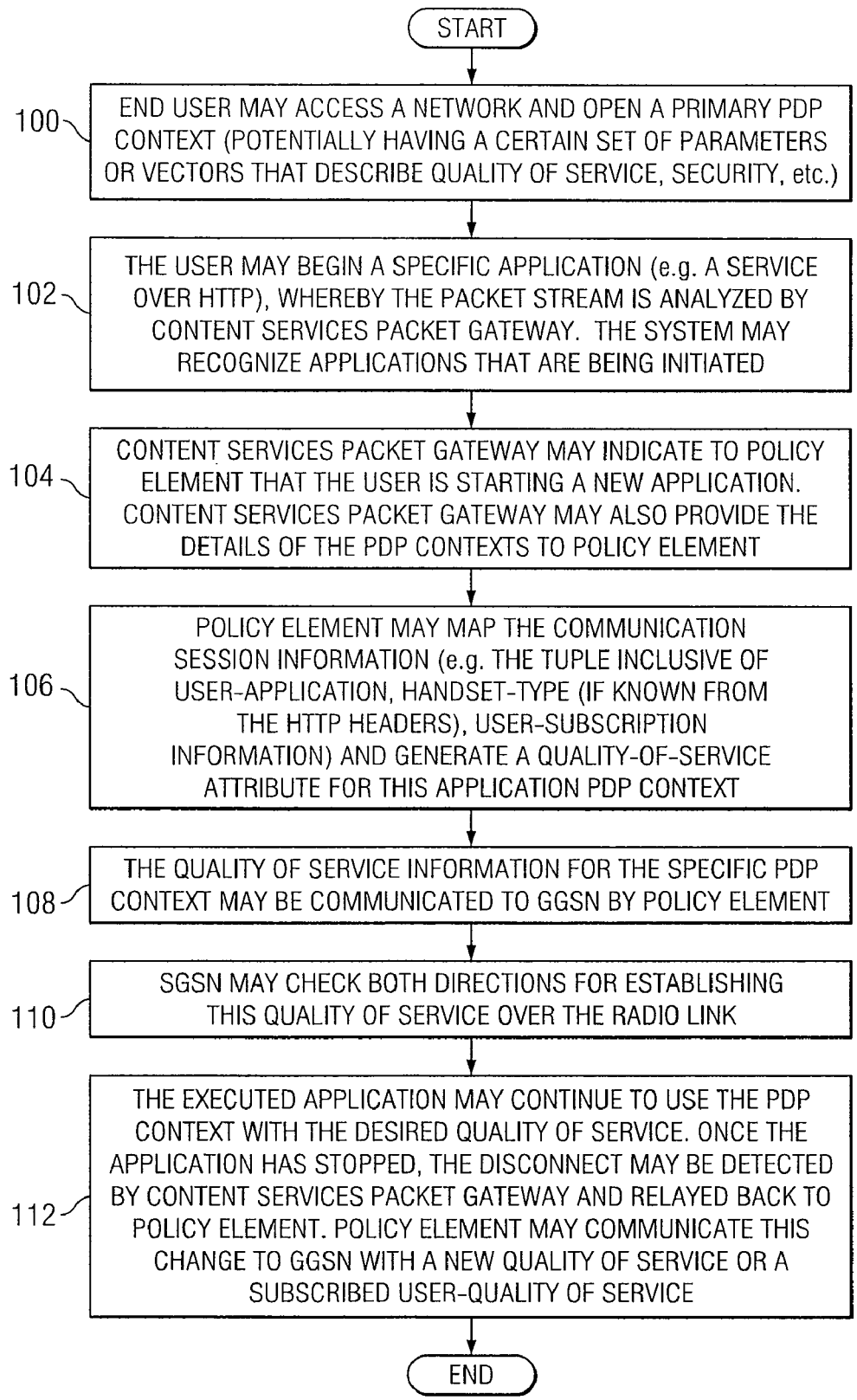
FIG. 3 is a simplified flowchart illustrating one example interaction between multiple elements included in the communication system.

FIG. 3 is a simplified schematic diagram illustrating a series of example steps associated with a method for providing a quality of service level in a network environment. FIG. 3 offers an example in which a user successfully establishes an application and subsequently receives a specific quality of service on a given radio network. The method begins at step 100 where end user 12 may access a network and open a primary PDP context (potentially having a certain set of parameters or vectors that describe quality of service, security, etc.). Thus, end user 12 brings up a primary PDP context via SGSN 18 to GGSN 30. The primary PDP context may be a GPRS data call, in this example, coming from a GPRS-enabled GSM mobile station. SGSN 18 may then identify the proper GGSN to which to direct this traffic and set up a GTP tunnel. The PDP context may include a default quality of service value set by the operator for all devices/components used by the user. In this example, a mobile station is used to illustrate the teachings of policy element 36 and CSPG 32. The default setting may reflect a best-effort level or a pre-set value for the user.

At step 102, the user may begin a specific application (e.g. a service over HTTP), whereby the packet stream is analyzed by CSPG 32. At step 104, CSPG may indicate to policy element 36 that the user is starting a new application. CSPG 32 may also provide the details of the PDP contexts to policy element 36. This is all considered to be within the broad scope of communication session information. At step 106, policy element 36 may map a tuple (e.g. user, application, handset-type (if known from the HTTP headers), user-subscription-info) and generate a quality-of-service attribute for this application/PDP context.

Note that the handset type (in this example) may be encoded in an HTTP header tag, and the subscription information can be stored in table 46 and retrieved by policy element 36. The quality of service information for the specific PDP context may be communicated to GGSN 30 by policy element 36 at step 108. GGSN 30 may issue an "update PDP context request" with the new quality of service values for the PDP context.

At step 110, SGSN 18 may check both directions (i.e. toward the internal resource management as well as toward RAN 14) for establishing this quality of service over the radio link. SGSN 18 may also respond back with an "update PDP context response." The request may be acknowledged successfully if all entities (RAN 14, SGSN 18) were able to reserve the requested quality of service values. GGSN 30 may respond back to policy element 36 with the response from SGSN 18. This may be used for billing purposes.

At step 112, the executed application may continue to use the PDP context with the desired quality of service. Once the application has stopped, the disconnect may be detected by CSPG 32 and relayed back to policy element 36. Policy element 36 may communicate this change to GGSN 30 with a new quality of service or a subscribed user-quality of service. Some of the previous steps may be carried out again to remove the earlier established quality of service.

Note that such a model can work without IMS support as well and work in the network without any intelligent mapping at the user device. This could be applied with a single PDP context support in the following way. For step 108 (and based on an operator configuration), policy element 36 my communicate additional filters that describe the application flow. This flow information can be used by GGSN 30 to install flow-filters that only allow this specific application flow. Other downlink traffic would not be allowed over the PDP context where the filters are installed.

Note that the example of FIG. 3 has been offered for purposes of discussion and teaching only. Accordingly, some of these steps may be changed, deleted, or replaced with other steps where appropriate. Such modifications may be based on particular communication needs or specific communication architectures and configurations and are within the scope of the present invention.

Although the present invention has been described in detail with reference to particular embodiments, it should be understood that various other changes, substitutions, and alterations may be made hereto without departing from the spirit and scope of the present invention. For example, although the present invention has been described as being capable of operating in packet data serving node (PDSN) or GGSN environments, the present invention may be used in any networking environment that routes or processes information based on the identity of an end user 12. The quality of service determination protocol disclosed in the preceding figures is generally applicable to all communication systems in which information packets are routed between or through IP networks.

Additionally, although the present invention has been described as operating in particular environments, the present invention may be used in any networking environment that seeks to glean information from within a communication flow. Communication system 10 may be used in conjunction with asynchronous transfer mode (ATM), frame relay, X.25, or any other type of packet or circuit-switched network.

Note also that although specific protocols are described herein in this document to illustrate example operations, any suitable communicative platforms may be used to effectuate the operations, which provide a quality of service level for end user 12 communication system 10. GGSN 30 may relay communication session information to any interested network elements via any suitable backend control protocol (e.g. GTP', RADIUS, DIAMETER, TACACS, etc.).

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. One or more non-transitory computer readable media comprising computer code, the computer code, when executed, configured to:
   receive one or more indications from a content services packet gateway (CSPG) that an end user has started a plurality of applications, a first application carried by a first packet data protocol (PDP) sub-tunnel of a General Packet Radio Service (GPRS) Tunneling Protocol (GTP) tunnel, the first PDP sub-tunnel having a first PDP context having a first default quality of service, a second application carried by a second PDP sub-tunnel of the tunnel, the second PDP sub-tunnel having a second PDP context having a second default quality of service;
   receive PDP context information describing the first PDP context and the second PDP context from the CSPG and generate and store a quality-of-service for each context at a policy element, the context information comprising one or more device capabilities and a user subscription of the end user;
   identify, from a table associating the PDP context information with a plurality of quality of services corresponding to the applications, a first quality of service corresponding to the first application identified using the one or more device capabilities, a second quality of service corresponding to the second application identified using the user subscription, the second quality of service different from the first quality of service; and
   communicate the quality of services to one gateway general packet radio service (GPRS) support node (GGSN) to allow the GGSN to issue an update to change from the first default quality of service to the first quality of service that is being used in the first context for the end user and to change from the second default quality of service to the second quality of service that is being used in the second context for the same end user.

2. The computer readable media of claim 1, the computer code further configured to:
   receive an update PDP context response responding to an update PDP context request requesting the first quality of service and the second quality of service.

3. The computer readable media of claim 1, the computer code further configured to:
   determine that an application of the applications for a PDP context of the PDP contexts has been disconnected; and
   send a new quality of service for the PDP context.

4. The computer readable media of claim 1, the end user associated with a default quality of service, the first quality of service and the second quality of service replacing the default quality of service.

5. The computer readable media of claim 1:
   the first application comprising a web browser application; and
   the second application comprising a telephony application.

6. A method comprising:
   receiving one or more indications from a content services packet gateway (CSPG) that an end user has started a plurality of applications, a first application carried by a first packet data protocol (PDP) sub-tunnel of a General Packet Radio Service (GPRS) Tunneling Protocol (GTP) tunnel, the first PDP sub-tunnel having a first PDP context having a first default quality of service, a second application carried by a second PDP sub-tunnel of the tunnel, the second PDP sub-tunnel having a second PDP context having a second default quality of service;
   receiving PDP context information describing the first PDP context and the second PDP context from the CSPG and generate and store a quality-of-service for each context at a policy element, the context information comprising one or more device capabilities and a user subscription of the end user;
   identifying, from a table associating the PDP context information with a plurality of quality of services corresponding to the applications, a first quality of service corresponding to the first application identified using the one or more device capabilities, a second quality of service corresponding to the second application identified using the user subscription, the second quality of service different from the first quality of service; and
   communicating the quality of services to one gateway general packet radio service (GPRS) support node (GGSN) to allow the GGSN to issue an update to change from the first default quality of service to the first quality of service that is being used in the first context for the end user and to change from the second default quality of service to the second quality of service that is being used in the second context for the same end user.

7. The method of claim 6, further comprising:
   receiving an update PDP context response responding to an update PDP context request requesting the first quality of service and the second quality of service.

8. The method of claim 6, further comprising:
   determining that an application of the applications for a PDP context of the PDP contexts has been disconnected; and
   sending a new quality of service for the PDP context.

9. The method of claim 6, the end user associated with a default quality of service, the first quality of service and the second quality of service replacing the default quality of service.

10. The method of claim 6:
    the first application comprising a web browser application; and
    the second application comprising a telephony application.

11. An apparatus comprising:
    a processor configured to:
      receive one or more indications from a content services packet gateway (CSPG) that an end user has started a plurality of applications, a first application carried by a first packet data protocol (PDP) sub-tunnel of a General Packet Radio Service (GPRS) Tunneling Protocol (GTP) tunnel, the first PDP sub-tunnel having a first PDP context having a first default quality of service, a second application carried by a second PDP sub-tunnel of the tunnel, the second PDP sub-tunnel having a second PDP context having a second default quality of service;

receive PDP context information describing the first PDP context and the second PDP context from the CSPG and generate and store a quality-of-service for each context at a policy element, the context information comprising one or more device capabilities and a user subscription of the end user;

identify, from a table associating the PDP context information with a plurality of quality of services corresponding to the applications, a first quality of service corresponding to the first application identified using the one or more device capabilities, a second quality of service corresponding to the second application identified using the user subscription, the second quality of service different from the first quality of service; and communicate the quality of services to one gateway general packet radio service (GPRS) support node (GGSN) to allow the GGSN to issue an update to change from the first default quality of service to the first quality of service that is being used in the first context for the end user and to change from the second default quality of service to the second quality of service that is being used in the second context for the same end user.

12. The apparatus of claim 11, the processor further configured to:
receive an update PDP context response responding to an update PDP context request requesting the first quality of service and the second quality of service.

13. The apparatus of claim 11, the processor further configured to:
determine that an application of the applications for a PDP context of the PDP contexts has been disconnected; and
send a new quality of service for the PDP context.

14. The apparatus of claim 11, the end user associated with a default quality of service, the first quality of service and the second quality of service replacing the default quality of service.

15. The apparatus of claim 11:
the first application comprising a web browser application; and
the second application comprising a telephony application.

* * * * *